United States Patent
Harada et al.

(10) Patent No.: US 8,202,483 B2
(45) Date of Patent: Jun. 19, 2012

(54) CATALYST-SUPPORTED PARTICULATE FILTER

(75) Inventors: Koichiro Harada, Higashi-Hiroshima (JP); Kenji Suzuki, Higashi-Hiroshima (JP); Kenji Okamoto, Hiroshima (JP); Hiroshi Yamada, Hiroshima (JP); Akihide Tamani, Hiroshima (JP)

(73) Assignee: Mazda Motor Corporation (JP)

( * ) Notice: Subject to any disclaimer, the term of this patent is extended or adjusted under 35 U.S.C. 154(b) by 912 days.

(21) Appl. No.: 12/169,725

(22) Filed: Jul. 9, 2008

(65) Prior Publication Data

US 2009/0041636 A1 Feb. 12, 2009

(30) Foreign Application Priority Data

Aug. 8, 2007 (JP) ................. 2007-206365

(51) Int. Cl.
*B01J 23/00* (2006.01)
*B01J 21/00* (2006.01)
*B01J 20/00* (2006.01)
*B01J 29/00* (2006.01)
*B01J 37/00* (2006.01)
*B01D 50/00* (2006.01)
*B01D 53/24* (2006.01)

(52) U.S. Cl. ........ 422/177; 502/302; 502/303; 502/304; 502/327; 502/332; 502/334; 502/339; 502/349; 502/355; 502/415; 502/439; 502/527.12; 502/527.13; 422/170; 422/180

(58) Field of Classification Search .................. 502/302, 502/303, 304, 327, 332, 334, 339, 349, 355, 502/415, 439, 527.12, 527.13; 422/170–180
See application file for complete search history.

(56) References Cited

U.S. PATENT DOCUMENTS

| | | | | |
|---|---|---|---|---|
| 5,212,142 A | * | 5/1993 | Dettling | 502/304 |
| 5,525,307 A | * | 6/1996 | Yasaki et al. | 422/171 |
| 5,990,038 A | * | 11/1999 | Suga et al. | 502/303 |
| 6,047,544 A | * | 4/2000 | Yamamoto et al. | 60/285 |
| 6,087,295 A | * | 7/2000 | Kharas et al. | 502/300 |
| 6,248,688 B1 | * | 6/2001 | Wu et al. | 502/302 |
| 6,306,794 B1 | * | 10/2001 | Suzuki et al. | 502/304 |
| 6,423,293 B1 | * | 7/2002 | Chun et al. | 423/579 |
| 6,432,859 B1 | * | 8/2002 | Iwakuni et al. | 502/66 |
| 6,464,946 B1 | * | 10/2002 | Yamada et al. | 422/177 |
| 6,497,851 B1 | * | 12/2002 | Hu et al. | 423/213.5 |

(Continued)

FOREIGN PATENT DOCUMENTS

EP 1820561 A1 8/2007

(Continued)

OTHER PUBLICATIONS

European Search Report for Application No. 08104893.6-1213 dated Nov. 25, 2008.

(Continued)

*Primary Examiner* — Cam N. Nguyen
(74) *Attorney, Agent, or Firm* — Studebaker & Brackett PC; Donald R. Studebaker

(57) ABSTRACT

In at least part of a catalyst layer of a particulate filter, a second catalyst part is exposed on the surface of the catalyst layer to overlie a first catalyst part, the first catalyst part contains Pt-carried activated alumina particles, the second catalyst part contains ZrNd-based mixed oxide particles containing a rare earth metal M and at least one of the first catalyst part and the second catalyst part further contains CeZr-based mixed oxide particles containing a rare earth metal R.

11 Claims, 4 Drawing Sheets

U.S. PATENT DOCUMENTS

| | | | |
|---|---|---|---|
| 6,677,264 B1* | 1/2004 | Klein et al. | 502/74 |
| 6,808,687 B1* | 10/2004 | Uenishi et al. | 422/177 |
| 6,877,313 B1* | 4/2005 | Phillips et al. | 60/297 |
| 6,881,384 B1* | 4/2005 | Uenishi et al. | 422/177 |
| 7,276,212 B2* | 10/2007 | Hu et al. | 422/177 |
| 7,329,629 B2* | 2/2008 | Gandhi et al. | 502/325 |
| 7,374,729 B2* | 5/2008 | Chen et al. | 422/177 |
| 7,473,665 B2* | 1/2009 | Kawai et al. | 422/177 |
| 7,490,464 B2* | 2/2009 | Li et al. | 60/295 |
| 7,524,465 B2* | 4/2009 | Kumar et al. | 422/180 |
| 7,550,124 B2* | 6/2009 | Chen et al. | 423/213.2 |
| 7,638,460 B2* | 12/2009 | Nakamura et al. | 502/326 |
| 7,673,448 B2* | 3/2010 | Voss et al. | 60/297 |
| 7,722,829 B2* | 5/2010 | Punke et al. | 422/180 |
| 7,749,472 B2* | 7/2010 | Chen et al. | 423/213.2 |
| 7,785,544 B2* | 8/2010 | Alward et al. | 422/179 |
| 7,875,250 B2* | 1/2011 | Nunan | 422/177 |
| 2002/0057997 A1* | 5/2002 | Mizuno et al. | 422/171 |
| 2002/0132732 A1* | 9/2002 | Brezny et al. | 502/304 |
| 2003/0021745 A1* | 1/2003 | Chen | 423/239.1 |
| 2003/0103886 A1* | 6/2003 | Dou | 423/239.1 |
| 2003/0175192 A1* | 9/2003 | Hu et al. | 423/239.1 |
| 2004/0065078 A1 | 4/2004 | Schafer-Sindlinger et al. | |
| 2005/0119117 A1 | 6/2005 | Yoshida et al. | |
| 2005/0227867 A1* | 10/2005 | Chen et al. | 502/325 |
| 2006/0057046 A1 | 3/2006 | Punke et al. | |
| 2006/0245985 A1 | 11/2006 | Harada et al. | |
| 2007/0054800 A1* | 3/2007 | Harada et al. | 502/302 |
| 2007/0104623 A1 | 5/2007 | Dettling | |
| 2007/0117716 A1* | 5/2007 | Honda et al. | 502/304 |
| 2007/0134138 A1* | 6/2007 | Matsuo et al. | 422/177 |
| 2007/0191219 A1 | 8/2007 | Fujita et al. | |
| 2007/0196245 A1 | 8/2007 | Fujita et al. | |
| 2008/0038172 A1* | 2/2008 | Chen et al. | 423/213.2 |
| 2008/0125308 A1* | 5/2008 | Fujdala et al. | 502/74 |
| 2008/0254973 A1 | 10/2008 | Okamoto et al. | |

FOREIGN PATENT DOCUMENTS

| | | |
|---|---|---|
| EP | 1920835 A2 | 5/2008 |
| JP | 2006326573 | 12/2006 |
| JP | 2007054713 | 3/2007 |
| JP | 2007056736 | 3/2007 |
| JP | 2007083224 | 4/2007 |
| JP | 1920835 A2 | 5/2008 |
| WO | WO 02/26379 A1 | 4/2002 |
| WO | 2005051523 A1 | 6/2005 |

OTHER PUBLICATIONS

K. Koteswara Rao et al. "Preparataion and characterization of bulk and nano particles . . . ", Materials Letters 54 (2002) pp. 205-210.

P. Thangadurai et al. :"Conductivity behaviour of a cubic/tetragonal phase stabilized", Journal of Physics and Chemistry of Solid, vol. 65 (2004) pp. 1905-1912.

* cited by examiner

CATALYST-SUPPORTED PARTICULATE FILTER

CROSS-REFERENCE TO RELATED APPLICATION

This application claims priority under 35 USC 119 to Japanese Patent Application No. 2007-206365 filed on Aug. 8, 2007, the entire contents of which are incorporated herein by reference.

BACKGROUND OF THE INVENTION (a) Field of the Invention

This invention relates to catalyst-supported particulate filters.

(b) Description of the Related Art

Exhaust gases from diesel engines using fuels containing diesel oil as a main component and exhaust gases from gasoline engines using fuels containing gasoline as a main component to burn them under fuel-lean conditions are known to contain particulates (suspended particulate matters containing carbon particles). To restrain particulates from being exhausted to the atmosphere, a filter for trapping particulates in exhaust gas is disposed in an exhaust gas passage of such an engine. When the amount of particulates deposited on the filter becomes large, this causes deterioration of engine power and fuel efficiency. Therefore, in this case, it is necessary to burn the deposited particulates as appropriate to remove them from the filter.

To effectively burn such deposited particulates (ignite the particulates at relatively low temperature and complete their burning in a short period of time), a catalyst layer containing catalytic metal-carried alumina is formed on the walls of exhaust gas channels in the body of such a filter. Catalytic metal-carried alumina is effective in burning particulates but there have been recently developed catalyst materials for filters capable of more efficiently burning particulates.

For example, Published Japanese Patent Application No. 2006-326573 describes the use of such a catalyst material in a filter. The catalyst material is a material in which a catalytic metal, such as platinum (Pt), is carried on a mixed oxide (composite oxide) containing cerium (Ce), zirconium (Zr) and a rare earth metal R selected from among praseodymium (Pr), neodymium (Nd) and lanthanum (La). The published document also describes that the content of R in the mixed oxide is preferably 2% to 11% by mole, both inclusive. Since such a mixed oxide contains Ce, it has oxygen storage/release capacity so that oxygen released from the mixed oxide contributes to ignition and burning of particulates.

Published Japanese Patent Application No. 2007-54713 describes the use of another catalyst material in a filter. The catalyst material is a material in which a catalytic metal is carried on mixed oxide ZrRO particles containing Zr and a rare earth metal R selected from among ytterbium (Yb), Nd and scandium (Sc) and having an R content of up to 18% by mole and mixed oxide CeMO particles containing Ce and a rare earth metal M selected from among samarium (Sm) and gadolinium (Gd). The ZrRO particles have oxygen ion conductivity to thereby release active oxygen but their oxygen release mechanism is different from that of CeZr-based mixed oxides as disclosed in Published Japanese Patent Application No. 2006-326573.

Specifically, oxygen storage component particles have high oxygen storage capacity and release active oxygen by the valence change of Ce ions. On the other hand, the ZrRO particles have oxygen conductivity, i.e., so-called oxygen pumping function, and transport, when having both of high-oxygen concentration sites and low-oxygen concentration sites on the particle surfaces, oxygen ions from high-oxygen concentration sites to low-oxygen concentration sites and then release them as active oxygen.

Therefore, for the ZrRO particles, when a small ignition site causing particulates to burn is formed on their surface and then falls into lack of oxygen, oxygen is transported from other high-oxygen concentration sites. Thus, the burning is continued and the burning region on each particle can be easily extended from the ignition site to the surrounding sites.

Published Japanese Patent Application No. 2007-83224 describes the use of still another catalyst material in a filter. The catalyst material is a material in which a catalytic precious metal, such as Pt, is carried on ZrRO having oxygen ion conductivity as stated above and alumina.

Furthermore, Published Japanese Patent Application No. 2007-56736 describes that a mixed oxide (such as $ZrO_2$—$Y_2O_3$) having oxygen ion conductivity and Pt-carried alumina are supported in layers on the walls of exhaust gas channels in a filter to lay the former on the latter.

SUMMARY OF THE INVENTION

Engine exhaust gas after-treatment systems are required not only to efficiently trap and burn off particulates but also to convert hydrocarbons (HC) and carbon monoxide (CO) in exhaust gas. But, what is particularly required is to enhance its exhaust gas conversion performance when the exhaust gas is at low temperatures. To cope with this, generally, a catalyst is disposed in an exhaust gas passage upstream of the position at which a particulate filter is placed, and used to oxidize HC and CO or oxidize NO in exhaust gas into $NO_2$.

In recent years, however, there has been stronger demand than ever before to increase the exhaust gas conversion efficiency. The demand to enhance the performance of such an upstream catalyst has accordingly been severer, which tends to increase the cost and size of the catalyst.

Particulate filters as disclosed in the above Published Japanese Patent Applications Nos. 2007-83224 and 2007-56736 can be expected to burn particulates and convert exhaust gas by the action of the oxygen ion-conductive mixed oxide and Pt-carried alumina, but their further improvement are desired in order to enhance their catalytic performance.

With the foregoing in mind, an object of the present invention is to give a catalyst disposed together with a particulate filter not only the function of promoting the burning of particulates but also the function of converting exhaust gas at low temperatures and thereby reduce the burden of the catalyst even if the catalyst is disposed upstream of the particulate filter.

To attain the above object, in the present invention, a catalyst for a particulate filter is essentially composed of a combination of Pt-carried activated alumina, a ZrNd-based mixed oxide containing a rare earth metal M and a CeZr-based mixed oxide containing a rare earth metal R.

Specifically, an aspect of the invention is directed to a catalyst-supported particulate filter in which a catalyst layer is formed on the walls of exhaust gas channels in a filter body for trapping particulates exhausted from an engine. In the particulate filter, the surface of the catalyst layer is formed to have a mixture of regions in which first catalyst parts are exposed and regions in which second catalyst parts are exposed with the second catalyst parts more widely exposed on the surface of the catalyst layer than the first catalyst parts, the first catalyst parts contain activated alumina particles carrying Pt, the second catalyst parts contain ZrNd-based mixed oxide particles containing Zr, Nd and a rare earth metal M other than Ce and Nd, and either one or both of the first catalyst parts and the second catalyst parts further contain CeZr-based mixed oxide particles containing Ce, Zr and a rare earth metal R other than Ce.

The Pt-carried activated alumina particles in the first catalyst parts are effective in burning particulates and act to oxidize HC and CO and oxidize NO into $NO_2$. The ZrNd-based mixed particles have oxygen ion conductivity to transport oxygen ions from high-oxygen concentration sites to low-oxygen concentration sites and then release them as active oxygen. Furthermore, the CeZr-based mixed oxide particles have oxygen storage/release capacity and release active oxygen by the valence change of Ce ions even in an oxygen-rich gas atmosphere. Specifically, it is believed that when oxygen storage components are used in a three-way catalyst repeating oxygen-rich conditions (fuel-lean conditions) and oxygen-lean conditions (fuel-rich conditions), they store oxygen under fuel-lean conditions and release oxygen under fuel-rich conditions. However, oxygen storage components perform oxygen exchange reactions in which even under fuel-lean conditions they release active oxygen from inside the oxide while taking oxygen into inside the oxide (see Published Japanese Patent Application No. 2007-190460 filed in Japan by the Assignee).

Therefore, active oxygen released from the ZrNd-based mixed oxide particles is effectively used for the burning of particulates and the CeZr-based mixed oxide particles having a different oxygen release mechanism aid in burning the particulates. Furthermore, the active oxygen release capacity of the ZrNd-based mixed oxide particles and CeZr-based mixed oxide particles effectively aids Pt carried on the activated alumina particles to oxidize HC and CO in exhaust gas and oxidize NO into $NO_2$, heat produced by oxidation reaction of these exhaust gas components promotes the burning of the particulates, and produced $NO_2$ serves as an oxidizing agent for efficiently burning the particulates.

Since in this aspect of the invention the surface of the catalyst layer of the filter body is formed to have a mixture of regions in which the first catalyst parts are exposed and regions in which the second catalyst parts are exposed, the following effects on the burning of particulates can be obtained.

Specifically, the ZrNd-based mixed oxide in the second catalyst parts releases active oxygen to particulates in contact with the mixed oxide and thereby works well in the burning of the particulates. In this aspect of the invention, since the second catalyst parts are widely exposed on the surface of the catalyst layer, this makes the ZrNd-based mixed oxide more likely to come into contact with particulates, which is advantageous in burning the particulates. On the other hand, the Pt-carried activated alumina particles in the first catalyst parts produce $NO_2$ as an oxidizing agent and thereby work well in the burning of particulates. The burning of particulates due to $NO_2$ is achieved without contact of particulates with the Pt-carried activated alumina particles. Therefore, $NO_2$ produced by the Pt-carried activated alumina particles not only burns off particulates deposited on the first catalyst parts but also works well in the burning of particulates deposited on the second catalyst parts.

As for exhaust gas conversion, since the second catalyst parts are widely exposed on the catalyst layer surface that is likely to be heated by exhaust gas, oxidation of CO can be likely to progress by active oxygen released from the ZrNd-based mixed oxide from when the exhaust gas temperature is relatively low. Furthermore, heat produced by the oxidation reaction of CO rapidly raises the catalyst temperature and, therefore, conversion of HC in exhaust gas can also be likely to progress.

In at least part of the regions in which the second catalyst parts are exposed on the surface of the catalyst layer, the second catalyst part is preferably laid on the first catalyst part.

Thus, $NO_2$ produced by the Pt-carried activated alumina particles in the underlying first catalyst part diffusely moves through the overlying second catalyst part and is then supplied to particulates deposited on the second catalyst part. This is advantageous in promoting the burning of the particulates.

Another aspect of the invention is also directed to a catalyst-supported particulate filter in which a catalyst layer is formed on the walls of exhaust gas channels in a filter body for trapping particulates exhausted from an engine. Furthermore, in at least part of the catalyst layer, first and second catalyst parts are layered with the second catalyst part overlying the first catalyst part and exposed on the surface of the catalyst layer, the underlying first catalyst part contains activated alumina particles carrying Pt, the overlying second catalyst part contains ZrNd-based mixed oxide particles containing Zr, Nd and a rare earth metal M other than Ce and Nd, and at least one of the first and second catalyst parts further contains CeZr-based mixed oxide particles containing Ce, Zr and a rare earth metal R other than Ce.

Also in this aspect of the invention, the same effects as in the former aspect of the invention can be obtained. Specifically, since the second catalyst part containing a ZrNd-based mixed oxide is exposed on the catalyst layer surface, this makes the ZrNd-based mixed oxide more likely to come into contact with particulates, which is advantageous in the burning of particulates due to active oxygen from the ZrNd-based mixed oxide. Furthermore, $NO_2$ produced by the Pt-carried activated alumina particles in the underlying first catalyst part diffusely moves through the overlying second catalyst part and is then supplied to particulates deposited on the second catalyst part. This is advantageous in promoting the burning of the particulates. Furthermore, since the second catalyst part is exposed on the catalyst layer surface that is likely to be heated by exhaust gas, oxidation of CO in exhaust gas can be likely to be progress by active oxygen released from the ZrNd-based mixed oxide. In addition, heat produced by the oxidation reaction of CO rapidly raises the catalyst temperature. Therefore, conversion of HC in exhaust gas can also be likely to progress.

Pt is preferably carried on either one or both of the ZrNd-based mixed oxide particles and the CeZr-based mixed oxide particles.

Thus, high-activity oxygen is actively supplied to particulates, which is advantageous in promoting the burning of the particulates.

Examples of the rare earth metal M contained in the ZrNd-based mixed oxide particles include La, Pr, Sm, Gd and Y. What is preferable in enhancing the particulate burning property is the use of at least one selected from the group consisting of La, Pr and Y. What is particularly preferable is the use of Pr as the rare earth metal M.

What is also preferable in enhancing the particulate burning property is that when the oxide of the rare earth metal M in the ZrNd-based mixed oxide particles is designated by MO, the proportion of the total amount of $Nd_2O_3$ and MO in the total amount of $ZrO_2$, $Nd_2O_3$ and MO is 18% to 30% by mole, both inclusive.

Examples of the rare earth metal R contained in the CeZr-based mixed oxide particles include La, Nd, Pr, Sm, Gd and Y. What is preferable in enhancing the particulate burning property is the use of at least one selected from the group consisting of La, Nd, Pr and Y. What is particularly preferable is the use of Nd as the rare earth metal R.

DETAILED DESCRIPTION OF THE INVENTION

Hereinafter, an embodiment of the present invention will be described with reference to the drawings. Note that the following description of the preferred embodiment is merely illustrative in nature and is not intended to limit the scope, applications and use of the invention.

Figure 1:
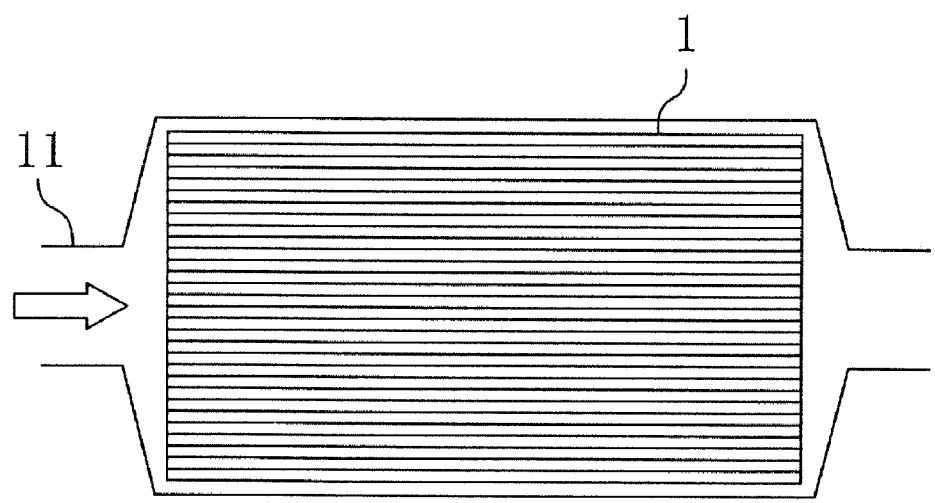
FIG. 1 is a schematic view showing the state that a particulate filter is disposed in an exhaust gas passage of an engine.

In FIG. 1, reference numeral 1 denotes a particulate filter (hereinafter, referred to simply as a "filter") disposed in an exhaust gas passage 11 of an engine. An oxidation catalyst (not shown) can be disposed in the exhaust gas passage 11 upstream of the filter 1 in the flow direction of exhaust gas. Such an oxidation catalyst is obtained by carrying a catalytic metal, such as platinum (Pt) or palladium (Pd), on a support material such as activated alumina. When such an oxidation catalyst is disposed upstream of the filter 1, HC and CO in the exhaust gas are oxidized by the oxidation catalyst and heat of the oxidation combustion increases the temperature of exhaust gas flowing into the filter 1. Furthermore, NO in the exhaust gas is oxidized into $NO_2$ by the oxidation catalyst and produced $NO_2$ is then supplied as an oxidizing agent for burning particulates to the filter 1.

Figure 2:
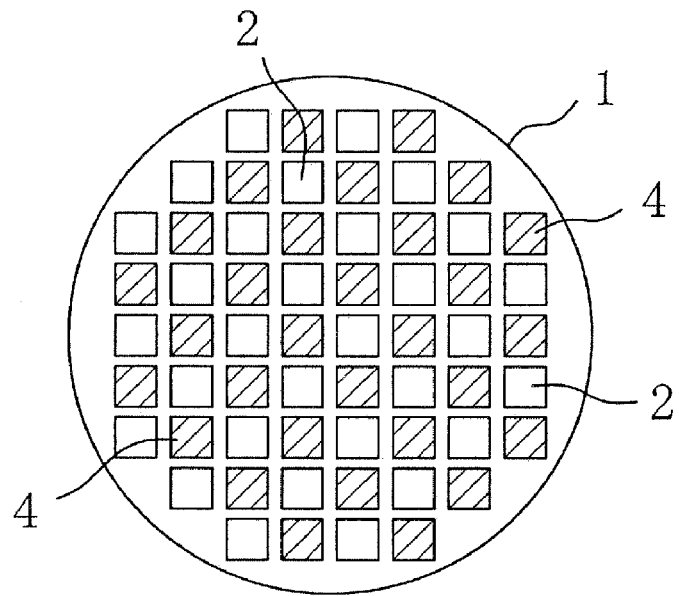
FIG. 2 is a front view schematically showing the particulate filter.
Figure 3:
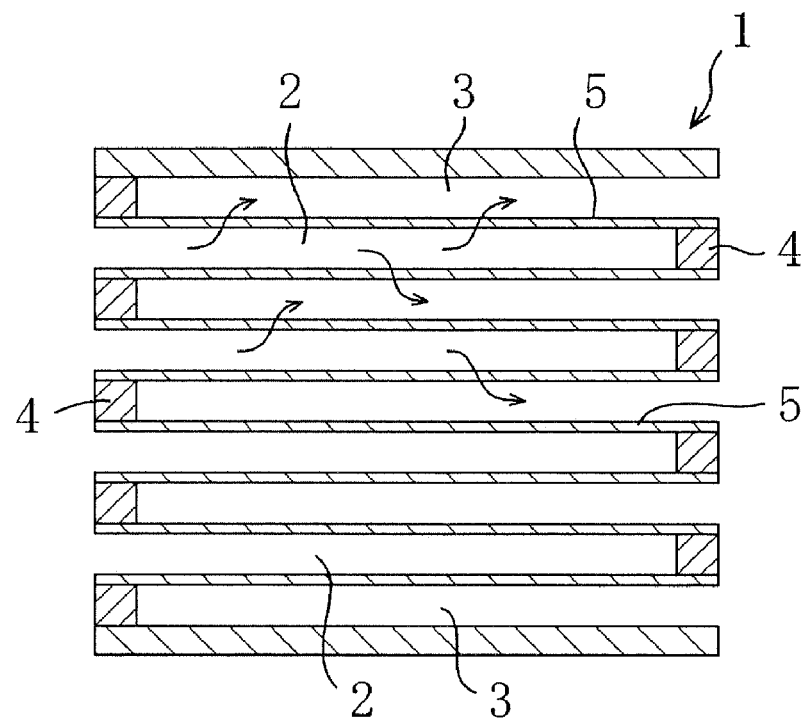
FIG. 3 is a longitudinal cross-sectional view schematically showing the particulate filter.

As schematically shown in FIGS. 2 and 3, the filter 1 has a honeycomb structure in which a large number of exhaust gas channels 2 and 3 run in parallel with each other. Specifically, the filter 1 has a structure in which a plurality of exhaust gas inflow channels 2 and a plurality of exhaust gas outflow channels 3 are alternately arranged vertically and horizontally. Each exhaust gas inflow channel 2 is closed at the downstream end by a plug 4, while each exhaust gas outflow channel 3 is closed at the upstream end by a plug 4. The adjacent exhaust gas inflow and outflow channels 2 and 3 are separated from each other by a thin partition wall 5. In FIG. 2, the hatched parts denote the plugs 4 at the upstream ends of the exhaust gas outflow channels 3.

Figure 4:
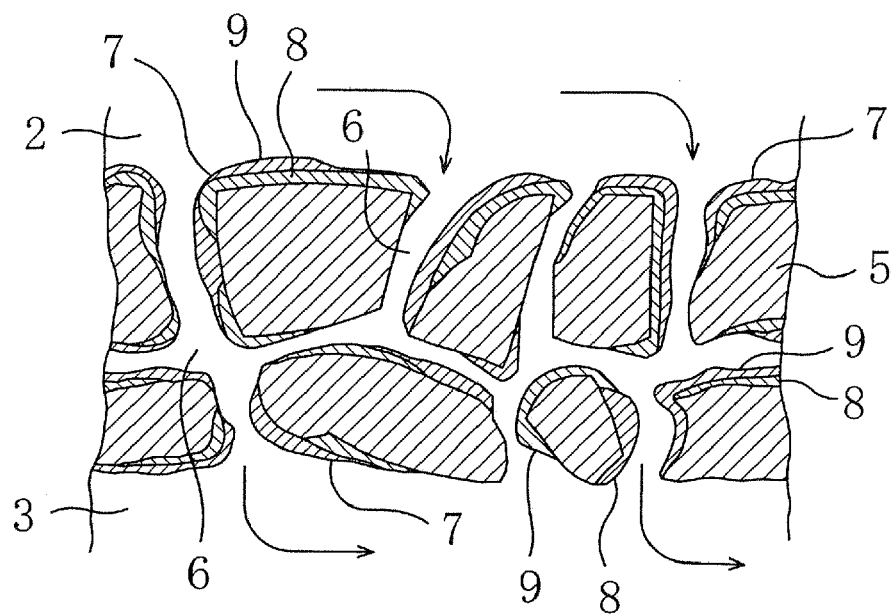
FIG. 4 is an enlarged cross-sectional view schematically showing a wall that separates an exhaust gas inflow channel from an exhaust gas outflow channel in the particulate filter.

The body of the filter 1, inclusive of the partition walls 5, is formed of cordierite or an inorganic porous material, such as SiC, $Si_3N_4$ or sialon. The exhaust gas flowing into each exhaust gas inflow channel 2 flows out through the surrounding partition walls 5 into the adjacent exhaust gas outflow channels 3, as shown in the arrows in FIG. 3. More specifically, as shown in FIG. 4, each partition wall 5 has micro pores (exhaust gas channels) 6 communicating the exhaust gas inflow channel 2 with the adjacent exhaust gas outflow channel 3 so that the exhaust gas flows through the micro pores 6. Particulates are trapped and deposited mainly on the wall surfaces of the exhaust gas inflow channels 2 and the micro pores 6.

A catalyst layer 7 is coated on the walls of all the exhaust gas channels (i.e., exhaust gas inflow channels 2, exhaust gas outflow channels 3 and micro pores 6) in the body of the filter 1. However, it is not necessarily required to form the catalyst layer on the walls of the exhaust gas outflow channels 3.

Figure 5:
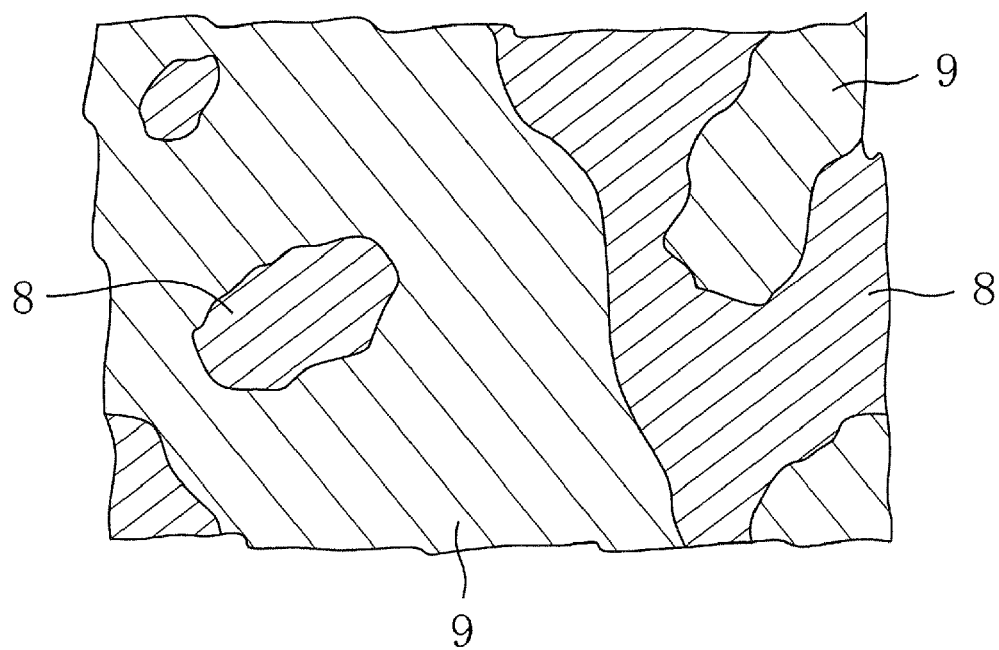
FIG. 5 is a plan view schematically showing a distribution of first catalyst parts and second catalyst parts on the catalyst layer surface of the particulate filter.

The catalyst layer 7 is composed of first catalyst parts 8 and second catalyst parts 9. The first catalyst parts 8 extend in direct contact with the surfaces of the partition walls 5. On the other hand, the second catalyst parts 9 include those formed and extending on the first catalyst parts 8 and those extending in direct contact with the surfaces of the partition walls 5. However, the second catalyst parts 9 do not cover all of the first catalyst parts 8 and the first catalyst parts 8 are partly exposed on the surface of the catalyst layer 7. Therefore, as schematically shown in FIG. 5, the surface of the catalyst layer 7 is formed to have a mixture of regions in which the first catalyst parts 8 are exposed and regions in which the second catalyst parts 9 are exposed. In addition, the second catalyst parts 9 are more widely exposed on the catalyst layer surface than the first catalyst parts 8. Furthermore, the portions of the catalyst layer 7 in which the second catalyst parts 9 partly cover the first catalyst parts 8 have a two-layer structure and the other portions have a single-layer structure composed of the first catalyst part 8 only or a single-layer structure composed of the second catalyst part 9 only.

Figure 6:
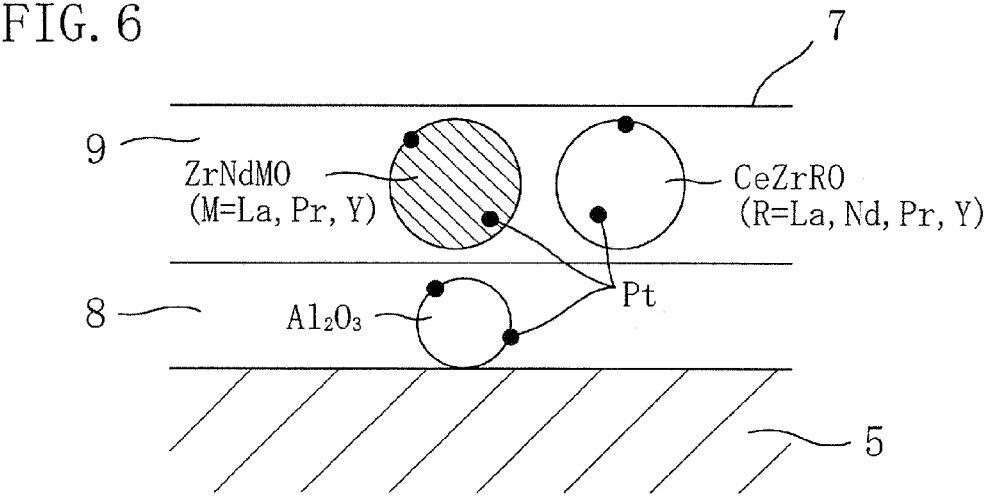
FIG. 6 is a cross-sectional view showing the configuration of the catalyst layer of the particulate filter.

FIG. 6 shows an example of the portions of the catalyst layer 7 having a two-layer structure. The underlying first catalyst part 8 contains, as a catalyst component, activated alumina ($Al_2O_3$) particles carrying Pt as a catalytic metal, while the overlying second catalyst part 9 contains a catalyst component obtained by carrying Pt as a catalytic metal on ZrNd-based mixed oxide particles (ZrNdMO) containing Zr and Nd in major proportions and a rare earth metal M (La, Pr or Y) other than Ce and Nd and a catalyst component obtained by carrying Pt as a catalytic metal on CeZr-based mixed oxide particles (CeZrRO) containing Ce and Zr in major proportions and a rare earth metal R (La, Nd, Pr or Y) other than Ce. All of the activated alumina particles, the ZrNd-based mixed oxide particles and CeZr-based mixed oxide particles are secondary particles formed by cohesion of primary particles. Both of the ZrNd-based mixed oxide particles and CeZr-based mixed oxide particles preferably contain $ZrO_2$ in a higher proportion than the other oxides.

A description is given below of preferred examples and comparative examples of the catalyst with reference to the following evaluation tests on their carbon burning properties and exhaust gas conversion performances.

<Preparation of Samples>

Prepared were samples (catalyst-supported particulate filters) of Examples 1 to 11 and Comparative Examples 1 to 5 shown in Table 2 with the use of their respective oxide powders shown in Table 1.

TABLE 1

| Oxide | Form and Composition |
|---|---|
| $Al_2O_3$ | Activated alumina powder containing 4% by mass of La |
| ZrNdPrO | Mixed oxide powder of $ZrO_2:Nd_2O_3:Pr_6O_{11}$ = 70:12:18 (molar ratio) |
| ZrNdLaO | Mixed oxide powder of $ZrO_2:Nd_2O_3:La_2O_3$ = 70:12:18 (molar ratio) |

TABLE 1-continued

| Oxide | Form and Composition |
|---|---|
| ZrNdYO | Mixed oxide powder of $ZrO_2:Nd_2O_3:Y_2O_3 = 70:12:18$ (molar ratio) |
| ZrNdO | Mixed oxide powder of $ZrO_2:Nd_2O_3 = 88:12$ (molar ratio) |
| CeZrNdO | Mixed oxide powder of $CeO_2:ZrO_2:Nd_2O_3 = 24:72:4$ (molar ratio) |
| CeZrO | Mixed oxide powder of $CeO_2:ZrO_2 = 70:30$ (molar ratio) |

TABLE 2

| Sample | First catalyst part (Lower layer) | Second catalyst part (Upper layer) | Carbon burning rate (g/h) | Light-off temperature (° C.) CO | HC |
|---|---|---|---|---|---|
| Ex. 1 | $Pt/Al_2O_3$ (10 g/L, Pt = 2 g/L) | ZrNdPrO (30 g/L)<br>CeZrNdO (10 g/L) | 0.84 | 196 | 203 |
| Ex. 2 | $Pt/Al_2O_3$ (10 g/L, Pt = 2 g/L)<br>CeZrNdO (10 g/L) | ZrNdPrO (30 g/L) | 0.79 | 209 | 215 |
| Ex. 3 | $Pt/Al_2O_3$ (10 g/L, Pt = 2 g/L)<br>CeZrNdO (5 g/L) | ZrNdPrO (30 g/L)<br>CeZrNdO (5 g/L) | 0.81 | 203 | 207 |
| Ex. 4 | $Pt/Al_2O_3$ (10 g/L, Pt = 1 g/L) | Pt/ZrNdPrO (30 g/L, Pt = 1 g/L)<br>CeZrNdO (10 g/L) | 0.87 | 192 | 202 |
| Ex. 5 | $Pt/Al_2O_3$ (10 g/L, Pt = 1 g/L) | ZrNdPrO (30 g/L)<br>Pt/CeZrNdO (10 g/L, Pt = 1 g/L) | 0.85 | 194 | 202 |
| Ex. 6 | $Pt/Al_2O_3$ (10 g/L, Pt = 1 g/L) | Pt/ZrNdPrO (30 g/L, Pt = 0.5 g/L)<br>Pt/CeZrNdO (10 g/L, Pt = 0.5 g/L) | 0.90 | 188 | 196 |
| Ex. 7 | $Pt/Al_2O_3$ (10 g/L, Pt = 1 g/L)<br>CeZrNdO (10 g/L) | Pt/ZrNdPrO (30 g/L, Pt = 1 g/L) | 0.84 | 194 | 203 |
| Ex. 8 | $Pt/Al_2O_3$ (10 g/L, Pt = 1 g/L)<br>Pt/CeZrNdO (10 g/L, Pt = 1 g/L) | ZrNdPrO (30 g/L) | 0.81 | 205 | 209 |
| Ex. 9 | $Pt/Al_2O_3$ (10 g/L, Pt = 2 g/L)<br>Pt/CeZrNdO (10 g/L, Pt = 0.5 g/L) | Pt/ZrNdPrO (30 g/L, Pt = 0.5 g/L) | 0.82 | 202 | 207 |
| Ex. 10 | $Pt/Al_2O_3$ (10 g/L, Pt = 2 g/L) | ZrNdLaO (30 g/L)<br>CeZrNdO (10 g/L) | 0.80 | 205 | 209 |
| Ex. 11 | $Pt/Al_2O_3$ (10 g/L, Pt = 2 g/L) | ZrNdYO (30 g/L)<br>CeZrNdO (10 g/L) | 0.81 | 204 | 209 |
| Comp. Ex. 1 | $Pt/Al_2O_3$ (10 g/L, Pt = 2 g/L) | ZrNdPrO (40 g/L) | 0.76 | 220 | 230 |
| Comp. Ex. 2 | $Pt/Al_2O_3$ (10 g/L, Pt = 2 g/L) | ZrNdO (40 g/L) | 0.72 | 226 | 234 |
| Comp. Ex. 3 | $Pt/Al_2O_3$ (10 g/L, Pt = 2 g/L) | ZrNdO (30 g/L)<br>CeZrO (10 g/L) | 0.77 | 215 | 223 |
| Comp. Ex. 4 | ZrNdPrO (30 g/L)<br>CeZrNdO (10 g/L) | $Pt/Al_2O_3$ (10 g/L, Pt = 2 g/L) | 0.69 | 220 | 229 |
| Comp. Ex. 5 | Single-layer coating | $Pt/Al_2O_3$ (10 g/L, Pt = 2 g/L), ZrNdPrO (30 g/L), CeZrNdO (10 g/L) | 0.72 | 223 | 230 |

To carry Pt on each oxide powder in the process of preparation of a sample, the oxide powder was mixed with a solution of diamminedinitro platinum nitrate and ion-exchanged water, then evaporated to dryness, then well dried and then calcined at 500° C. in the atmospheric environment for two hours. In Table 2, the oxides indicated with "Pt/" mean oxides on which Pt is carried. Furthermore, the value in the parentheses on the right of the chemical formula of each oxide indicates the amount of oxide supported per L of filter body and, if Pt is carried on the oxide, the amount of Pt carried is also appended in the parentheses.

To form a catalyst layer, each catalyst material (oxide powder in Table 1 or the same carrying Pt) was mixed with a binder and ion-exchanged water into a slurry. The slurry was coated on a support (filter body) for a filter made of silicon carbide (SiC) having a volume of 25 mL, a cell wall thickness of 16 mil ($406.4 \times 10^{-3}$ mm) and 178 cells per square inch (645.16 $mm^2$), then dried and then calcined by keeping it at 500° C. for two hours in the atmospheric environment. For Examples and Comparative Examples containing first and second catalyst parts, a catalyst material for the first catalyst parts was first coated on the support, dried and calcined and, then, a catalyst material for the second catalyst parts was coated on the support, dried and calcined.

When the catalyst material for the first catalyst parts was coated on the filter body, it is not well spread on the wall surfaces of the exhaust gas channels because of the micro pores 6 of small diameter. Therefore, the catalyst material does not uniformly adhere to all over the wall surfaces of the exhaust gas channels, is not coated on part of them and has an uneven thickness. In addition, also when the catalyst material for the second catalyst parts was coated on the filter body, it does not uniformly adhere to all the surfaces of the first catalyst parts, is not coated on part of them, has an uneven thickness, and partly adhere to the wall surfaces where the first catalyst parts are not coated. Therefore, as shown in FIGS. 4 and 5, the catalyst layer partly has a two-layer structure composed of the first catalyst part and the second catalyst part and its surface has a mixture of regions in which the first catalyst parts are exposed and regions in which the second catalyst parts are exposed. Furthermore, since the first catalyst parts are at least partly covered with the second catalyst parts later coated on the first catalyst parts, the second catalyst parts are more widely exposed on the catalyst layer surface than the first catalyst parts.

Each sample was heat aged by keeping it at 800° C. for 24 hours in the atmospheric environment and then subjected to evaluation tests on its carbon burning property and exhaust gas conversion performance.

<Evaluation Test on Carbon Burning Property>

10 mL ion-exchanged water was added to an amount of carbon (carbon black) corresponding to 10 g per L of filter and stirred for five minutes with a stirer, thereby well dispersing carbon into the water. One end surface of each sample was dipped into the carbon-dispersed water and, concurrently, water in the sample was aspirated from the other end surface with an aspirator. Water having not been removed by the aspiration was removed by air blow from the one end surface and the sample was then put in a dry oven and dried therein by keeping it at 150° C. for two hours. Thus, carbon was deposited on the walls of exhaust gas channels in the sample filter.

The sample was attached to a fixed-bed, simulated gas flow reactor. In this state, simulated exhaust gas (composed of 10% $O_2$, 300 ppm NO, 10% $H_2O$ and $N_2$) was allowed to flow through the sample at a space velocity of 80000/h and, concurrently, the gas temperature at the catalyst sample entrance was increased at a rate of 15° C./min. Then, the carbon burning rate at the time when the gas temperature reaches 590° C. was measured. In this case, the carbon burning rate was calculated based on the amounts of CO and $CO_2$ produced by carbon burning and according to the following equation.

Carbon burning rate (g/h)={gas flow rate (L/h)×[CO and $CO_2$ concentration (ppm)/1×10$^6$]}/22.4×12

<Evaluation Test on Exhaust Gas Conversion Performance>

Each sample was attached to a fixed-bed, simulated gas flow reactor. In this state, simulated exhaust gas (composed of 200 ppmC HC, 400 ppm CO, 100 ppm NO, 10% $O_2$, 4.5% $CO_2$, 10% $H_2O$ and $N_2$) was allowed to flow through the sample at a space velocity of 50000/h and, concurrently, the gas temperature at the catalyst sample entrance was increased at a rate of 30° C./min. Then, the gas temperature at the catalyst sample entrance when the conversion efficiency of each of HC and CO reaches 50% (light-off temperature) was measured.

<Test Results>

The test results are shown in the above Table 2 together with the components of each sample. Referring to Table 2, Examples 1 to 3 exhibited higher carbon burning rates and lower light-off temperatures for HC and CO than Comparative Example 1. This shows that in order to enhance particulate burning property and low-temperature exhaust gas conversion performance, it is effective to add CeZr-based mixed oxide powder to at least either the first catalyst parts or the second catalyst parts. Comparative Example 3 exhibited better carbon burning property and light-off performance than Comparative Example 2. This also shows that addition of CeZr-based mixed oxide powder to the catalyst layer is effective in enhancing particulate burning property and low-temperature exhaust gas conversion performance. Furthermore, from the result that Example 1 exhibited better carbon burning property and light-off performance than Examples 2 and 3, it can be seen that the CeZr-based mixed oxide powder is preferably contained in the second catalyst parts (upper layer).

From the result that Example 1 exhibited better carbon burning property and light-off performance than Comparative Examples 4 and 5, it can be seen that when the catalyst layer has a two-layer structure, the ZrNd-based mixed oxide particles and the CeZr-based mixed oxide particles are preferably contained in the second catalyst parts (upper layer). In Comparative Example 4, unlike Example 1, ZrNd-based mixed oxide particles are contained in the first catalyst parts. Therefore, catalyst parts containing Pt-carried activated alumina particles are more widely exposed on the catalyst layer surface than catalyst parts containing ZrNd-based mixed oxide particles. In addition, from the result that Comparative Example 1 exhibited better carbon burning property and light-off performance than Comparative Example 2, it can be said that the ZrNd-based mixed oxide preferably contains Pr as a third component.

From the result that Examples 4 to 6 exhibited better carbon burning property and light-off performance than Example 1, it can be seen that Pt as a catalytic metal should not be totally carried on the activated alumina particles but preferably partly carried on the ZrNd-based mixed oxide particles or the CeZr-based mixed oxide particles. Particularly, it is preferable, as in Example 6, to carry Pt on all of the activated alumina particles, the ZrNd-based mixed oxide particles and the CeZr-based mixed oxide particles in a dispersed manner.

From the result that Examples 7 to 9 exhibited better carbon burning property and light-off performance than Example 2, it can be seen that also when a CeZr-based mixed oxide is contained in the first catalyst parts (lower layer), Pt as a catalytic metal should not be totally carried on the activated alumina particles but preferably partly carried on the ZrNd-based mixed oxide particles or the CeZr-based mixed oxide particles. However, from the result that Example 7 exhibited better carbon burning property and light-off performance than Examples 8 and 9, it can be seen that Pt is preferably carried on the ZrNd-based mixed oxide.

From the result that Example 1 exhibited better carbon burning property and light-off performance than Examples 10 and 11, it can be said that the most preferable rare earth metal M for use in the ZrNd-based mixed oxide particles is Pr.

<Preferable Composition of ZrNd-Based Mixed Oxide>

To determine a preferable composition of the ZrNd-based mixed oxide, various kinds of mixed oxide powders using La, Pr and Y as the rare earth metal M and having different proportions of $Nd_2O_3$ (% by mole) and different proportions of MO (% by mole) were prepared. Next, Pt was carried on each of the various kinds of mixed oxide powders, thereby preparing various kinds of catalyst materials. Note that the catalyst materials contained neither activated alumina nor CeZr-based mixed oxide.

Each of the obtained catalyst materials was coated, like the previously-stated evaluation tests, on a support (filter body) for a filter made of SiC, then dried and calcined, thereby obtaining a sample. The amount of each ZrNd-based mixed oxide powder carried per L of filter was 50 g/L, and the amount of Pt carried per L of filter was 0.5 g/L. Then, each sample was heat aged by keeping it at 800° C. for 24 hours in the atmospheric environment and then measured in terms of carbon burning rate at 590° C. under the same conditions as in the previous-stated evaluation test and amount of CO produced. The measurement results are shown in Table 3.

TABLE 3

| Sample Number | Nd oxide (% by mole) | M oxide (% by mole) | Type of M | Total amount (% by mole) | Carbon burning rate at 590° C. (g/h) | Produced CO (ppm) |
| --- | --- | --- | --- | --- | --- | --- |
| 1 | 12.0 | 0.0 | — | 12.0 | 0.70 | — |
| 2 | 20.0 | 0.0 | — | 20.0 | 0.71 | — |

TABLE 3-continued

| Sample Number | Nd oxide (% by mole) | M oxide (% by mole) | Type of M | Total amount (% by mole) | Carbon burning rate at 590° C. (g/h) | Produced CO (ppm) |
|---|---|---|---|---|---|---|
| 3 | 0.0 | 12.0 | La | 12.0 | 0.68 | — |
| 4 | 0.0 | 12.0 | Pr | 12.0 | 0.69 | — |
| 5 | 6.0 | 6.0 | La | 12.0 | 0.72 | — |
| 6 | 6.0 | 12.0 | La | 18.0 | 0.72 | — |
| 7 | 12.0 | 3.0 | La | 15.0 | 0.74 | — |
| 8 | 12.0 | 6.0 | La | 18.0 | 0.79 | — |
| 9 | 12.0 | 12.0 | La | 24.0 | 0.75 | — |
| 10 | 18.0 | 6.0 | La | 24.0 | 0.78 | — |
| 11 | 18.0 | 12.0 | La | 30.0 | 0.77 | — |
| 12 | 6.0 | 6.0 | Pr | 12.0 | 0.71 | — |
| 13 | 6.0 | 12.0 | Pr | 18.0 | 0.77 | — |
| 14 | 12.0 | 3.0 | Pr | 15.0 | 0.72 | — |
| 15 | 12.0 | 6.0 | Pr | 18.0 | 0.74 | — |
| 16 | 12.0 | 12.0 | Pr | 24.0 | 0.82 | 4 |
| 17 | 12.0 | 18.0 | Pr | 30.0 | 0.87 | 5 |
| 18 | 12.0 | La: 3.0, Pr: 12.0 | La, Pr | 27.0 | 0.87 | 5 |
| 19 | 12.0 | La: 3.0, Pr: 18.0 | La, Pr | 33.0 | 1.10 | 8 |
| 20 | 18.0 | 12.0 | Pr | 30.0 | 0.91 | 8 |
| 21 | 6.0 | 6.0 | Y | 12.0 | 0.72 | — |
| 22 | 12.0 | 3.0 | Y | 15.0 | 0.73 | — |
| 23 | 12.0 | 6.0 | Y | 18.0 | 0.74 | — |
| 24 | 12.0 | 12.0 | Y | 24.0 | 0.77 | — |
| 25 | 18.0 | 12.0 | Y | 30.0 | 0.80 | — |

Table 3 shows that Samples 5, 12 and 21 containing a combination of La, Pr or Y with Nd exhibited higher carbon burning rates than Samples 3 and 4 containing no Nd. Therefore, it is can be said to be preferable that Nd is an essential ingredient. However, in the case where only Nd is used as the rare earth metal M as in Samples 1 and 2, the carbon burning rate did not increase with increasing amount of Nd. Therefore, it can be said to be preferable that Nd is used in combination with La, Pr or Y.

Comparison among the cases where the proportion of MO is low (among Samples 7, 14 and 22 and among Samples 8, 15 and 23) shows that the use of La as M is more advantageous than the use of Pr or Y in increasing the carbon burning rate. On the other hand, comparison among the cases where the proportion of MO is high (between Samples 6 and 13 and among Samples 11, 20 and 25) shows that the use of Pr as M is more advantageous than the use of La or Y in increasing the carbon burning rate.

Furthermore, as the proportion of the total amount of $Nd_2O_3$ and MO increased, the carbon burning rate generally increased, with minor exceptions. However, as seen from the results of Samples 16 to 20, when the above total amount increased and the carbon burning rate increased accordingly, the amount of CO produced due to imperfect combustion of carbon tended to increase. Therefore, although it is advantageous in enhancing the particulate burning property that the proportion of the above total amount is high, it is preferable that the proportion is not more than 30% by mole in order to restrain the increase in the amount of CO produced.

On the other hand, when the proportion of the above total amount reached 18% by mole or more, the carbon burning rate generally became high. Therefore, it can be said to be preferable that the proportion of the above total amount is not less than 18% by mole in enhancing the particulate burning property. Particularly, from the comparison among Samples 6, 8, 13, 15 and 23, it can be said to be preferable to attain a proportion of the above total amount of 18% by mole or more while raising the proportion of $Nd_2O_3$ or $Pr_6O_{11}$.

<Carbon Burning Rate of CeZr-Based Mixed Oxide>

Prepared were various kinds of powdered CeZr-based mixed oxides (CeZrRO) containing different kinds and proportions of rare earth metals R. Then, Pt was carried on each of the powdered mixed oxides, thereby preparing various kinds of catalyst materials. Note that the catalyst materials contained neither activated alumina nor ZrNd-based mixed oxide.

Figure 7:
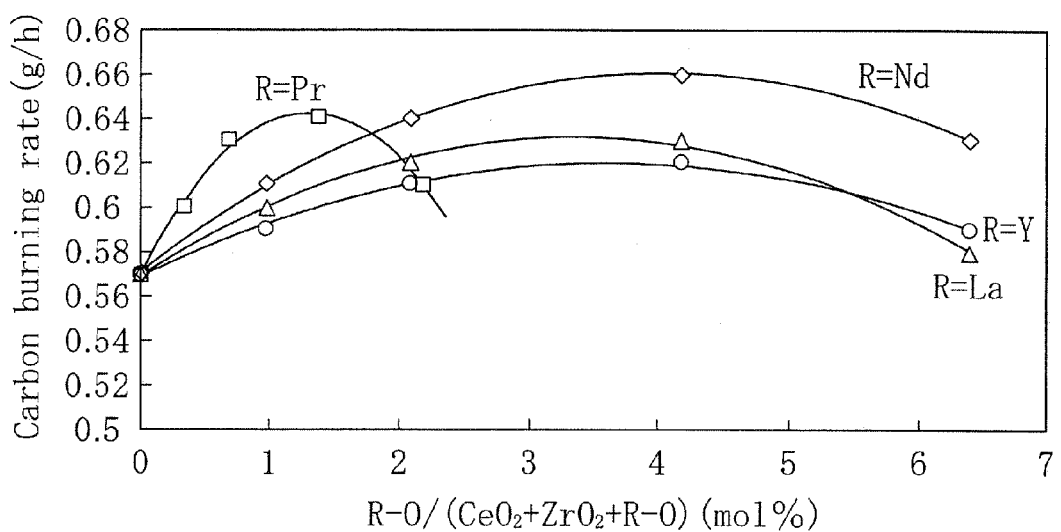
FIG. 7 is a graph showing the relation between carbon burning rate and the proportion of each of various kinds of rare earth metal R oxides in their respective CeZr-based mixed oxides.

Each of the obtained catalyst materials was coated, like the previously-stated evaluation tests, on a support for a filter made of SiC (a filter body having a volume of 25 mL, a cell wall thickness of 12 mil ($304.8 \times 10^{-3}$ mm) and 300 cells per square inch (645.16 $mm^2$), then dried and calcined, thereby obtaining a sample. The amount of each CeZr-based mixed oxide powder carried per L of filter was 50 g/L, and the amount of Pt carried per L of filter was 0.5 g/L. Then, each sample was heat aged by keeping it at 800° C. for 24 hours in the atmospheric environment and then measured in terms of carbon burning rate at 590° C. under the same conditions as in the previous-stated evaluation test. The measurement results are shown in FIG. 7. The abscissa of FIG. 7 represents the proportion (% by mole) of rare earth metal oxide R—O in each CeZr-based mixed oxide.

FIG. 7 shows that when the rare earth metal R was Pr, relatively high carbon burning rates were reached at small proportions of the rare earth metal oxide R—O of 2% by mole or less and that when the rare earth metal R was Nd, La or Y, relatively high carbon burning rates were reached at proportions of the rare earth metal oxide R—O of not more than 6% by mole or not more than 7% by mole. Furthermore, it can be said that, among the four kinds of rare earth metals, the use of Nd is most advantageous in enhancing the carbon burning property.

What is claimed is:

1. A catalyst-supported particulate filter in which a catalyst layer is formed on the walls of exhaust gas channels in a filter body for trapping particulates exhausted from an engine, wherein
the surface of the catalyst layer is formed to have a mixture of regions in which first catalyst parts are exposed and regions in which second catalyst parts are exposed, the second catalyst parts being more widely exposed on the surface of the catalyst layer than the first catalyst parts, the first catalyst parts contain activated alumina particles carrying Pt, the second catalyst parts contain ZrNd-based mixed oxide particles containing Zr, Nd and a rare earth metal M other than Ce and Nd, wherein the second catalyst parts do not contain Ce and activated alumina particles carrying Pt, and either one or both of the first catalyst parts and the second catalyst parts further contain CeZr-based mixed oxide particles containing Ce, Zr and a rare earth metal R other than Ce.

2. The catalyst-supported particulate filter of claim 1, wherein in at least part of the regions in which the second catalyst parts are exposed on the surface of the catalyst layer, the second catalyst part is laid on the first catalyst part.

3. The catalyst-supported particulate filter of claim 1, wherein the catalyst layer has a single-layer part composed of the first catalyst parts only, and a single-layer part composed of the second catalyst parts only.

4. A catalyst-supported particulate filter in which a catalyst layer is formed on the walls of exhaust gas channels in a filter body for trapping particulates exhausted from an engine, wherein in at least part of the catalyst layer, first and second catalyst parts are layered with the second catalyst part overlying the first catalyst part and exposed on the surface of the catalyst layer, the underlying first catalyst part contains activated alumina particles carrying Pt, the overlying second catalyst part contains ZrNd-based mixed oxide particles containing Zr, Nd and a rare earth metal M other than Ce and Nd, wherein the overlying second catalyst part does not contain Ce and activated alumina particles carrying Pt, and at least one of the first and second catalyst parts further contains CeZr-based mixed oxide particles containing Ce, Zr and a rare earth metal R other than Ce.

5. The catalyst-supported particulate filter of claim 4, wherein Pt is carried on either one or both of the ZrNd-based mixed oxide particles and the CeZr-based mixed oxide particles.

6. The catalyst-supported particulate filter of claim 4, wherein the rare earth metal M contained in the ZrNd-based mixed oxide particles is at least one selected from the group consisting of La, Pr and Y.

7. The catalyst-supported particulate filter of claim 4, wherein when the oxide of the rare earth metal M in the ZrNd-based mixed oxide particles is designated by MO, the proportion of the total amount of $Nd_2O_3$ and MO in the total amount of $ZrO_2$, $Nd_2O_3$ and MO is 18% to 30% by mole, both inclusive.

8. The catalyst-supported particulate filter of claim 4, wherein the rare earth metal R contained in the CeZr-based mixed oxide particles is at least one selected from the group consisting of La, Nd, Pr and Y.

9. The catalyst-supported particulate filter of claim 4, wherein the CeZr-based mixed oxide particles contain Nd as the rare earth metal R.

10. The catalyst-supported particulate filter of claim 4, wherein the ZrNd-based mixed oxide particles contain Pr as the rare earth metal M.

11. The catalyst-supported particulate filter of claim 4, wherein the catalyst layer contains a single-layer part composed of the first catalyst parts only, and a single-layer part composed of the second catalyst parts only.

* * * * *

UNITED STATES PATENT AND TRADEMARK OFFICE
CERTIFICATE OF CORRECTION

PATENT NO. : 8,202,483 B2
APPLICATION NO. : 12/169725
DATED : June 19, 2012
INVENTOR(S) : Koichiro Harada et al.

Page 1 of 1

It is certified that error appears in the above-identified patent and that said Letters Patent is hereby corrected as shown below:

On the Title Page, fifth inventor
Item (75) Inventors should read: Akihide TAKAMI, Hiroshima (JP)

Signed and Sealed this
Thirty-first Day of December, 2013

Margaret A. Focarino
*Commissioner for Patents of the United States Patent and Trademark Office*